United States Patent [19]

Clippard

[11] Patent Number: 5,317,724

[45] Date of Patent: May 31, 1994

[54] SIMPLEX SEQUENCE CONTROLLER

[75] Inventor: Stephen R. Clippard, Tampa, Fla.

[73] Assignee: Helix Research & Development, Inc., Tampa, Fla.

[21] Appl. No.: 861,449

[22] Filed: Apr. 1, 1992

[51] Int. Cl.⁵ .................... G06F 13/00; G06F 15/46
[52] U.S. Cl. .................... 395/550; 395/275; 395/375; 364/138; 364/140
[58] Field of Search .............. 364/138, 140, 141, 143; 395/275, 325, 375, 425, 550, 700, 725

[56] References Cited

U.S. PATENT DOCUMENTS

| | | | |
|---|---|---|---|
| 3,772,659 | 11/1973 | De Vries | 340/173 SP |
| 3,827,030 | 7/1974 | Seipp | 395/375 |
| 3,996,565 | 12/1976 | Nakao et al. | 340/172.5 |
| 4,025,902 | 5/1977 | Nakao et al. | 340/172.5 |
| 4,093,997 | 6/1978 | Germer | 364/900 |
| 4,195,339 | 3/1980 | Smith et al. | 364/200 |
| 4,197,589 | 4/1980 | Cornish et al. | 364/900 |
| 4,333,143 | 6/1982 | Calder | 395/275 |
| 4,375,084 | 4/1983 | Urushibata | 364/900 |
| 4,415,965 | 11/1983 | Imazeki et al. | 364/136 |
| 4,419,761 | 12/1983 | Kuze | 377/16 |
| 4,435,827 | 3/1984 | Kuze | 377/44 |
| 4,453,208 | 6/1984 | Middleton et al. | 364/140 |

Primary Examiner—Robert L. Richardson
Attorney, Agent, or Firm—Pettis & McDonald

[57] ABSTRACT

A simplex sequence controller for transmittal of output data is disclosed and includes a time base generator for generating a timing signal, a memory device having a plurality of addressable sequential storage locations for storing a sequence of data pattern with a plurality of output lines and a plurality of input address lines connected to the storage locations, along with an addressing apparatus connected to the memory device input address lines for directing access to predetermined storage locations at predetermined points in the data sequence, and address reset apparatus providing feedback from a first predetermined one of the output lines of the memory device to the addressing apparatus to direct access to a predetermined initial data sequence for output from the memory.

15 Claims, 5 Drawing Sheets

SIMPLEX SEQUENCE CONTROLLER

BACKGROUND OF THE INVENTION

Many types of equipment and processes require apparatus to control their operation so that they perform steps in predetermined sequences. To effect the control of these steps various types of controllers have been used, ranging from simple mechanical devices up to microprocessor driven process control systems. Where electronic control is required, a microprocessor based system is very capable, providing for programmable control sequences of any desired complexity. However, where the control sequences are comparatively simple, the cost of the microprocessor and the ancillary equipment needed for its operation can be excessively expensive for the application. Further, the flexible control of a microprocessor requires that it execute a number of operational cycles to effect the steps in a control sequence, thus rendering the microprocessor slower, as well as more expensive, than is desirable.

What is needed is a sequence controller that is simpler in construction and operation, and therefore less expensive than the conventional microprocessor based controllers, but which have the capability of commanding any of several sets of operational sequences.

SUMMARY OF THE INVENTION

In order to overcome the disadvantages of the prior art, it is an object of the present invention to provide a sequence controller capable of controlling any of a plurality of procedural step sequences without the requirement for the complexity of a microprocessor. According to the present invention there is provided a simplex sequence controller for transmittal of output data of user specified duration and content that includes a time base generator, means for selectively enabling or disabling the time base generator to provide pauses in operation, the memory means having a plurality of addressable sequential storage locations for storing a sequence of data patterns within each such storage location for random access thereof, addressing means connected to a plurality of input address lines for directing address to predetermined memory storage locations at predetermined points in the data sequence and address reset means providing feedback from one of a plurality of output lines from the memory means to the addressing means to direct access to a predetermined initial data sequence from output from the memory.

BRIEF DESCRIPTION OF THE DRAWINGS

FIG. 4 illustrates one typical example of data patterns to be stored in the memory device of the apparatus of FIG. 1.

DESCRIPTION OF PREFERRED EMBODIMENTS

Figure 1:
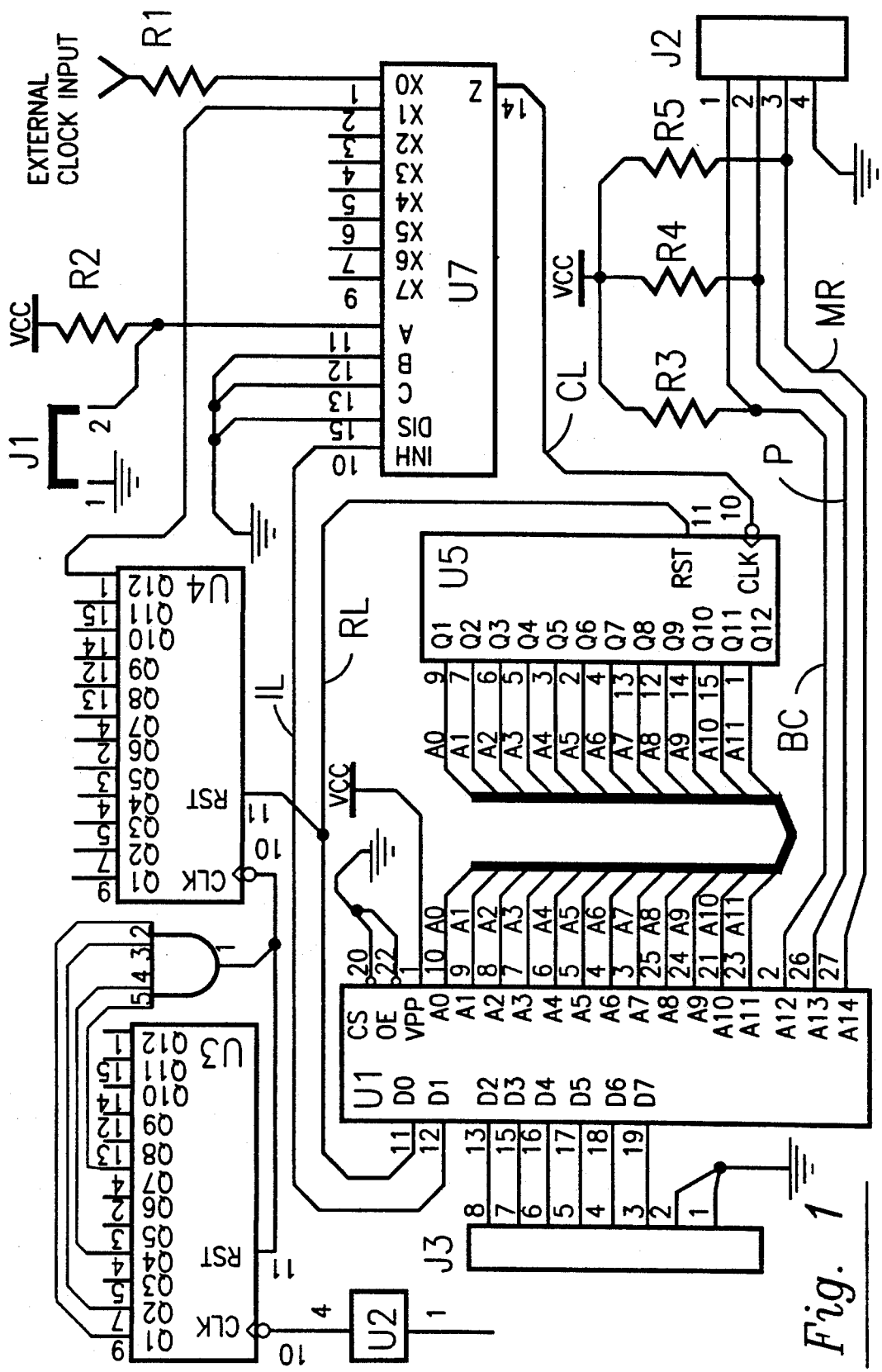
FIG. 1 is a schematic diagram of one preferred embodiment of the simplex sequence controller of the present invention.

A particularly preferred embodiment of the simplex sequence controller of the present invention is shown on FIG. 1. Starting in the upper left hand portion of FIG. 1 are the time base generator components which, in this embodiment, conveniently include a conventional oscillator U2, such as a crystal oscillator, having an output, suitably at pin 4 thereof, fed into a frequency divider that includes resettable counters U3 and U4, which may conveniently be type 4040 devices, such as an MC14040B binary counter. As the clock signal comes into pin 10 of U3, the outputs Q1 through Q12 are driven from a low state (0) to a high state (1). When the outputs Q1, Q2, Q4 and Q7 have all been driven high, those outputs, applied to pins 2, 3, 4 and 5 of the AND gate U6, which may conveniently be a type 4082, then drive the output 1 of U6 high, providing that input high into pin 10 of U4 and also resetting counter U3 through pin 11. This places the outputs Q1, Q2, Q4 and Q7 again in the low state until they receive the appropriate number of clock pulses from the oscillator U2 to take them all high again.

When the output of AND gate U6 goes high, it provides a clock pulse input into pin 10 of counter U4, which serves as another part of the prescaler or frequency divider, and which functions in a manner generally similar to that of U3. Counter U4 conveniently serves to divide the count input on pin 10 by a suitable number, such as 4,096, before the output Q12 on pin 1 of U4 goes high to provide a clock pulse to the clock multiplexer U7. Counter U7, which may conveniently be a type 4512 device, serves as a clock multiplexer and inhibit network and includes the internal clock input from output Q12 of counter U4 fed into inputs A and X1 of U7, as well as any desired external clock input, which is fed into input X0 through resister R1, which may conveniently be about 22k ohms. Jumper J1 is provided to enable selective grounding of the input from U4 when the jumper is in place, thus shorting out the clock input from U4 and providing for use of the external clock input. Pull-up resister R2, which may conveniently also be of about 22k ohms value, fed by the power supply VCC which conveniently may be a 5 volt supply, serves to maintain a high on multiplexer input A to effect use of the internal clock except when pull-up resister R2 is grounded by jumper J1, thus permitting the input A to go low and transfer control over to the external clock input.

Output Z of the clock multiplexer U7, suitably through pin 14 thereof, is then carried down through the clock line CL to the counter U5 that serves as an address pointer or sequence counter. The counter U5 may suitably also be a type 4040 device, operating in a manner substantially similar to that of counters U3 and U4, in which a clock pulse is received on the clock input at pin 10, thus incrementing the outputs Q1 through Q12 on pins 1 through 9 and 12 through 14. So long as the clock pulses are coming through to input pin 10 of U5, the counter will continue to increment the outputs Q1 through Q12, thus incrementing the addresses put out on the address bus to the address inputs A0 through A11 of memory means U1, which may suitably be a type 27256 EPROM solid state memory device. Thus, the incremented counting outputs of address pointer U5 will step through the various sequential memory locations in the memory device U1 so long as the clock input on pin 10 of U5 is enabled. If a reset signal from reset line RL is received on pin 11 of U5, the reset signal will override the clock and stop it from incrementing so long as that reset signal is present.

The memory device U1 provides outputs D0 through D7 on pins 11 through 13 and 15 through 19 to a suitable output jack J3, which may be a conventional 8-pin jack. In the memory device U1 are stored in chronological order a data sequence or sequences in the form of output data patterns. These data sequences are stored in a plurality of addressable sequential storage locations within the memory device, with a number of such storage locations being defined by the amount of time required for transmitting the data sequence divided by the length of the timing interval. Thus, the user has direct control over the specified sequence length at the time of programming the memory device, unlike conventional sequence controllers that contain a specified set of data and only terminates upon completion of a terminal count or external intervention. Preferably the memory device U1 is divided into a plurality of banks of memory locations. By way of example, the total memory may be divided into eight banks, which may conveniently be grouped as four upper banks and four lower banks, with access to those banks being selectable by input signals to the memory device.

The data or operational steps stored in the memory device are programmed in the conventional manner and may include any desired data or commands. For example, the data may be utilized for operating machine tools or for storing any other form of information that is to be read out sequentially. As described above and in greater detail below, the address pointer, which is incremented by the time base generator, directs the readout of the memory device to retrieve data from incremented, sequential locations, although such incrementing may be stopped or paused if and when desired, and the address pointer may shift its operation among a plurality of separate banks of memory location within the memory device, if desired. Typically, the data stored in any selected bank of the memory device will be read out sequentially from the first storage location of that bank to the last such storage location in which data for a given data sequence is held and in which is stored a terminal count that will reset the address pointer to location 0, either for repeating the process or for performing a similar process in a different selected bank of the memory device.

A feature of this invention is the simple and straightforward resetting arrangement for the address pointer. As noted above, upon receipt of a terminal count, the output D0 of memory device U1 will go high, thus producing a high on pin 11 of that device, which is connected by reset line to pin 11 of the frequency dividing prescaler U4 of the time base generator and also to pin 11 of the address pointer U5. Thus, where the output D0 of memory device U1 is high, this will reset the address pointer back to the address 0 on whatever memory bank has been selected. Typically, the programming of the memory device U1 and the address pointer U5 will normally provide, in a conventional manner, a low on pin 10 of U5, thus permitting the clock sequence on line CL from the clock multiplexer U7 to the address pointer U5 to increment and keep going until the output of memory U1 produces another high in the memory location on output D0, thus resetting the memory and the address pointer and starting over again.

Inhibit line IL receives the output from memory location D1 on pin 12 of memory device U1 and carries it to the inhibit input at pin 10 of the clock multiplexer U7. The programming in the memory device U1 typically will be programmed in a conventional manner to go high as soon as data begins to be read out of the memory device upon command of the address pointer. This places a high on pin 12 of U1 and thus on pin 10 of clock multiplexer U7, disabling either the internal or external clock, whichever is active, from sending any further signals through the multiplexer U7. This prevents any further clock pulses from leaving pin 14 of U7 to the address pointer U5 along clock line CL, which is tied into pin 10 of address pointer U5. In this manner the address pointer is prevented from incrementing until all of the data in a predetermined sequence is read out of the memory device U1, up to the point of permitting the output D1 to go low again, thus releasing the inhibit signal from the inhibit line and permitting additional clock pulses to flow.

When it is desired to pause the operation of the sequence controller of this embodiment, the pause line P connected to address location A13 and pin 26 of the memory device U1 may be used to effect an external pause. This is provided by programming the memory device U1 such that, whenever pin 26 is pulled low, it will send a high signal on output D1, thus activating the inhibit line and preventing any further clock pulses from leaving the multiplexer U7 on pin 14 thereof. Thus, the address pointer U5 will remain at that particular point in memory until either the pause is released or some other activity changes the state of the address lines. For example, if the selected bank of memory is changed such that the address being pointed to in that changed bank directs the inhibit line to go back low, the inhibit will be released, thus allowing the count to continue from multiplexer U7 through pin 14 into input 10 of the address pointer U5. This will permit the address pointer U5 to continue sequentially counting until it either hits a new pause or a reset.

A reset of the memory bank selection may be effected by the master reset line MR connected to pin 27 on memory device U1, which is tied into address location A14 in this embodiment, which may be selected to be the memory location for selecting the upper set of memory banks or the lower set of memory banks. The master reset line MR preferably is tied to a pull-up resister R5, which is connected to a voltage source VCC to keep the master reset line at a high state, thus selecting one-half of the memory in U1, suitably the upper half or upper set of banks of that memory. The master reset line may also be connected through jack J2 to an appropriate switch that will ground the line, thus bringing it low when desired, to select the other bank of addresses, suitably the lower bank. Typically the memory device U1 is programmed to keep the output D0 at pin 11 of U1 low except when it receives the terminal sequence from the memory, whereupon it will go high. As noted above, this will reset the prescaler U4 and also the address pointer, starting off back at address 0 again, with the address pointer U5 then continuing to sequence. Where the master reset line is brought low, conveniently by a grounding switch connected to jack J2, this produces a low on the master reset line connected to pin 27 and address location A14 on U1, which selects the lower bank of addresses. When that lower bank is selected, U1 is conventionally programmed such that bit 0 in the memory device U1, which is output on line D0 and pin 11 of U1, puts out a high that resets the prescaler U4 and also the address pointer U5 and maintains the reset line high, at that reset condition, until the master reset line MR at memory address A14 goes high, such as by releasing the grounding switch or whatever is pulling the master reset low. This will then cause the output D0 of U1 to go low again, releasing the reset line and permitting the prescaler U4 and the address pointer to continue counting. Thus, the master reset MR permits switching to the lower bank of memory and maintaining the address pointer at address 0 while that master reset is activated or enabled.

When the master reset is enabled, the time base generator still continues to count unless the inhibit line IL from output D1 of U1 is enabled. Thus, with the clock continuing to count, clock pulses may come into the address pointer at pin 10 from the clock multiplexer, but the high on the reset line of pin 11 of the address pointer will maintain priority over the clock, preventing incrementing of the address pointer. Thus, even though the address pointer is getting clock pulses instructing it to proceed to subsequent addresses, by keeping pin 11 on the address pointer U5 high through the reset line, this will maintain the address pointer at address 0, regardless of the clock pulses received.

If desired, the memory U1 may also be programmed such that dropping pin 27 low does not immediately put a high on pin 11, which is connected to the internal reset line. Instead, it may be desired to have the memory programmed to proceed through several additional steps commanded by sequential memory locations to perform a shutdown or other action in response to the master reset before the internal reset line RL is brought high to force the address pointer back to address 0. Such an arrangement might conveniently be used in controlling a machine tool where it is desired to retract a tool out of the way before a reset is performed, in order to avoid damaging the equipment or breaking a tool.

In FIG. 1 the branch control line BC connected to address A12 at pin 2 of memory device U1 functions in a manner generally similar to that of the pause line and master reset line, in that it is normally held high by resistor R3, in the same manner that resistor R4 normally holds the pause line high and resistor R5 normally holds the master reset line high. Each of these resistors R3, R4 and R5 may be of any convenient value, such as 22k ohms, and all are connected to the voltage source VCC and to the jack J2, to which may be connected convenient grounding switches, not shown. As with the master reset and the pause, if the branch control line is brought low, as by grounding that line by a switch connected to J2, this will bring the input on pin 2 of U1 low. Preferably, the branch control is given control over the selection of sequences in the memory U1 subordinate to both the master reset and the pause control. With these three lines going into the memory, the binary control offered by the application of either a high or a low to each of the three inputs A12, A13 and A14 on respective pins 2, 26 and 27 necessarily result in there being $2^3$, or eight, possible sections of memory available for addressing.

As noted above, the master reset in this embodiment controls the selection of the upper bank of four sections of memory or the lower bank of four sections of memory. The selective application of either a high or a low to the pause line effects a further division of each of those four sections of memory into either of two groups of two sections, and the branch control selects one of those two selected sections of memory for access by the address pointer. The selection by the branch control is determined by whether the branch control line is high or low, generally in the manner described with respect to the master reset above. Thus, it may be seen that if all three of the master reset, pause and branch control lines are high, this will select the very highest bank of memory, and if all of those lines are low, such will select the very lowest bank of memory, with combinations of highs and lows on the respective master reset, pause and branch control lines selecting various of the memory banks between those two extremes. Obviously, it is possible to have additional address lines than the three shown in FIG. 1, providing for more pauses, more branch controls and more resets.

Figure 2:
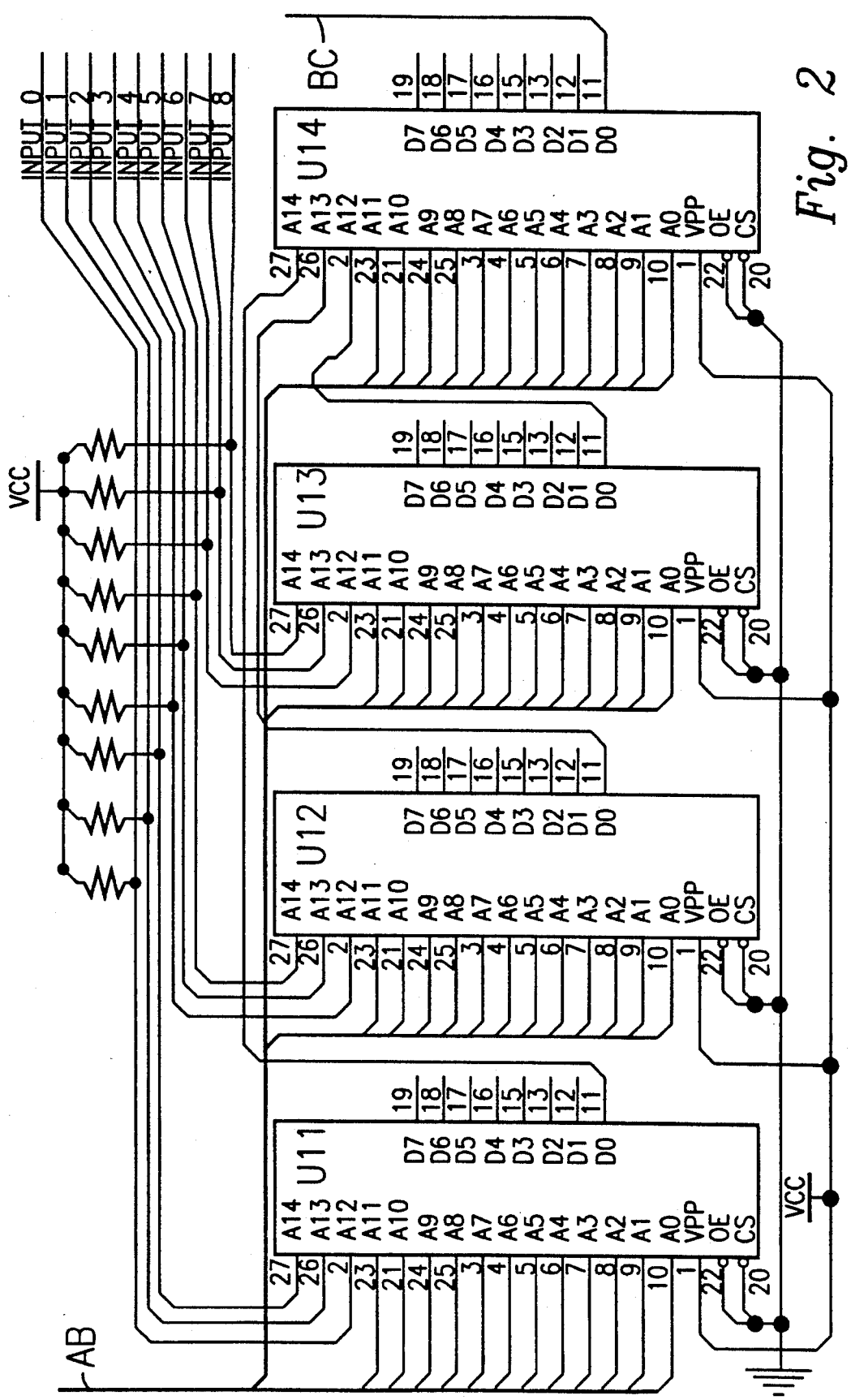
FIG. 2 illustrates an expanded branch control that may be used with the apparatus of FIG. 1.

In FIG. 2 is illustrated a branch control circuit utilizing nine input control lines in place of the three lines utilized in FIG. 1. In utilizing four additional memory devices, U11 through U14 tied to the address bus. The nine input lines, input 0 through input 8, a normally held high by the resistors R6 through R14, respectively. By the availability of the two binary states on these nine inputs, this additional memory can be divided into an address as $2^9$ or 512 memory banks, as distinguished from the eight memory banks described in connection with FIG. 1. As shown, the address bus addresses each of the memory devices U11 through U14, and the D0 outputs of the memory devices U11 through U13 provide the three control inputs into memory device U14 which, like the others, is typically a type 27256 device. The output on output line D0 of the final memory device, U14, may conveniently be attached to the branch control line in the apparatus of FIG. 1. It may be noted that the memory devices U11 through U14 are also provided with connections VPP for programming voltage for the device, OE, which is the output enable connection and CS, which is the chip select connection that disables the chip if the signal on that line is high. The bank selection and operation of this additional memory is substantially as set forth in the description above.

Figure 3:
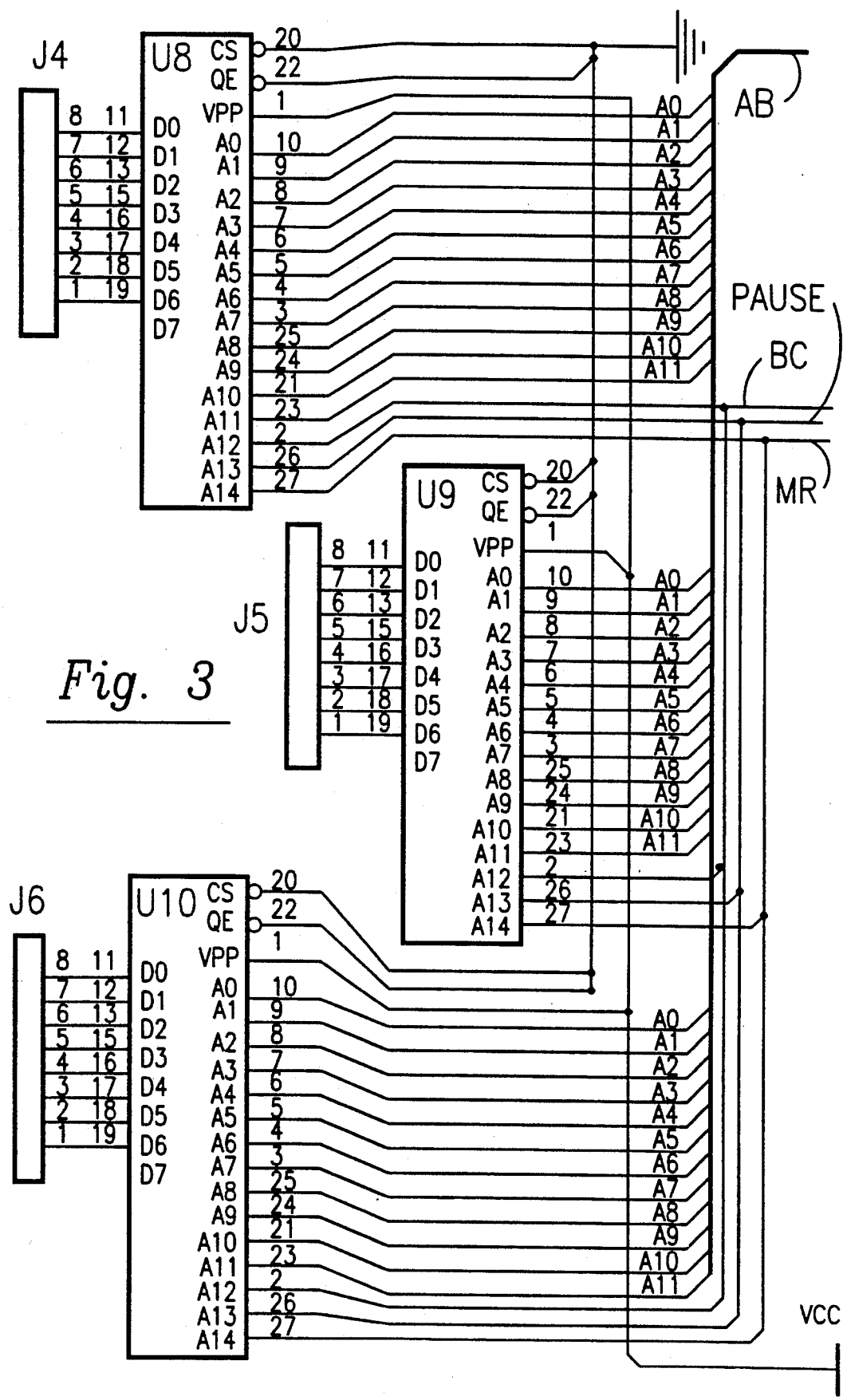
FIG. 3 illustrates an arrangement for expanding the output data that may be added to the apparatus of FIG. 1.

On FIG. 3 of the drawings is shown another variation of the apparatus of FIG. 1 providing for expanded outputs. In this variation the memory devices U8, U9 and U10, which may be substantially the same as memory device U1, are connected to the address bus in parallel with memory device U1. As with memory device U1, the branch control, pause and master reset lines are likewise connected to these memory devices U8, U9 and U10 to provide for the selection of the various banks of memory in the memory devices. This arrangement provides for substantial expansion of the data sequences that can be output from the system by substantially increasing the memory capacity while maintaining the use of comparatively simple and inexpensive devices, such as the type 27256 memory devices. Thus, from the foregoing it may be seen that the sequence controller of this invention provides for control of numerous functions employing sequential data patterns while utilizing comparatively simple and inexpensive components instead of the more complex microprocessor based devices.

One suitable programming routine for use with the apparatus of this invention, written in the programming language C, is generally as follows, in which there are provided input files "in", output files "out" and in which the initial count "c" is zero. First, to open the pattern file if there is not a file alert showing, use the programming steps

```
if ((in = fopen ("Temp.Pat","rb"))==NULL)
{ printf ("/nCan't Find Temp.Pat/n/n"); exit (1);}
out = fopen ("Temp1.Bin","wb");
```

Then, to provide for conversion of the text from binary to hexadecimal notation, use the following routine:

```
c = getc (in);
while (!feof(in))
{
    Number = 0;
    for (Count=0;Count<6;Count++)
    { Number = (Number += c & 1) << 1; C = getc (in); }
    Number = (Number += c & 1) << 1;
```

To read in the number of repetitions or intervals, use the following steps:

```
fscanf (in,"%d",&Count);
printf ("%02X %d/n",Number,Count);
while (Count--) { putc (Number,out); Total++; }
c = getc (in); c = getc (in); c = getc (in); }
```

Next, by adding one to "Number" you enter the reset bit, and this Number is now used to fill the lower bank for resetting the sequencer.

```
Number ++;
while (Total++ < 4096) { putc (Number,out); }
fclose (in);
fclose (out);
```

Then you close the files and reopen the temporary file as an input file and open the binary output file as follows:

```
in = fopen ("Temp1.Bin","rb");
out = fopen ("Temp.Bin","wb");
```

To fill the lower bank with the reset byte:

```
for (Count=0;Count<4096;Count++)
{ putc (Number,out); }
```

To fill the upper bank with pattern data bytes:

```
for (Count=0;Count<4096;Codunt++)
{ putc ((c = getc (in)),out); }
```

Finally, to close and delete the temporary file:

```
fclose (in); fclose (out); unlink ("Temp1.Bin"); }
```

Figure 4:
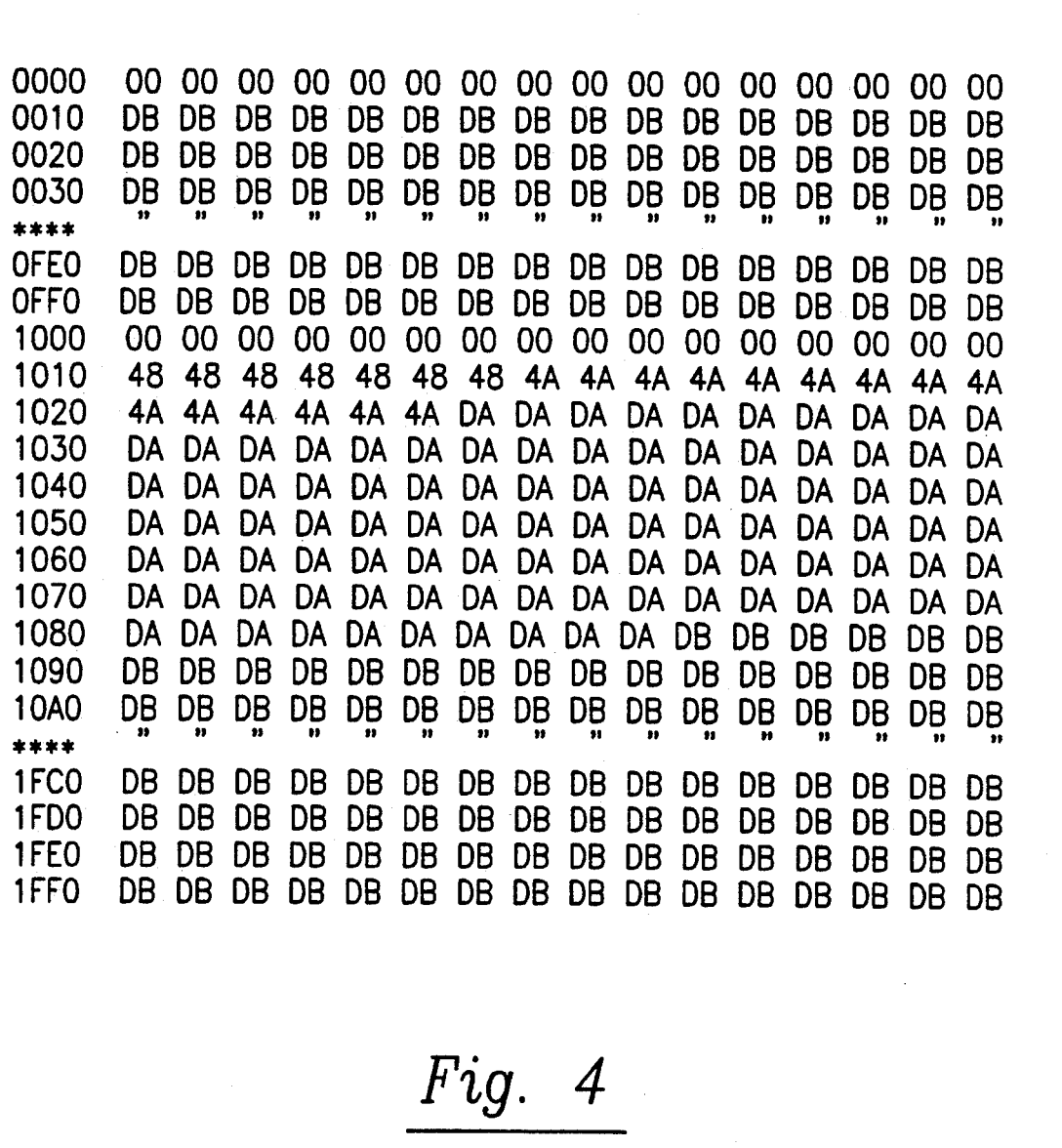

The results of applying the foregoing routines to the apparatus of FIG. 1 in a typical application may be shown in FIG. 4, which illustrates a temporary input file assuming a sequence rate of 10 hertz and a data pattern "DB" for reset with the following other binary codes for other selected data patterns in this typical example:

| | | | |
|---|---|---|---|
| 0000000 | 5 | Data Pattern 00 For | 0.5 Seconds |
| 0001000 | 10 | Data Pattern 10 For | 1.0 Seconds |
| 0100100 | 8 | Data Pattern 48 For | 0.8 Seconds |
| 0100101 | 15 | Data Pattern 4A For | 1.5 Seconds |
| 1101101 | 100 | Data Pattern DA For | 10.0 Seconds |

The temporary binary output file for this typical example is shown in FIG. 4, where the lower bank and the unused portion of the upper bank has a reset bit set high, for example:

$$DBh = 1101\ 101\ [1],$$

where the [1] is the high reset bit. As shown in FIG. 4, much of the output file consists of the reset pattern DB stored in the memory device with the sequence data starting at address 1000$h$, which represents a hexadecimal address location. After a repeated sequence of reset bits suspending operation of the sequencer, when the address pointer reaches hexadecimal address 1000, the data patterns set forth above are read out for the predetermined periods of time, and then the remaining memory locations are again filled with reset bits, so that further readout of the data sequence awaits recycling of the sequencer, which results in repetition of this output.

Figure 5:
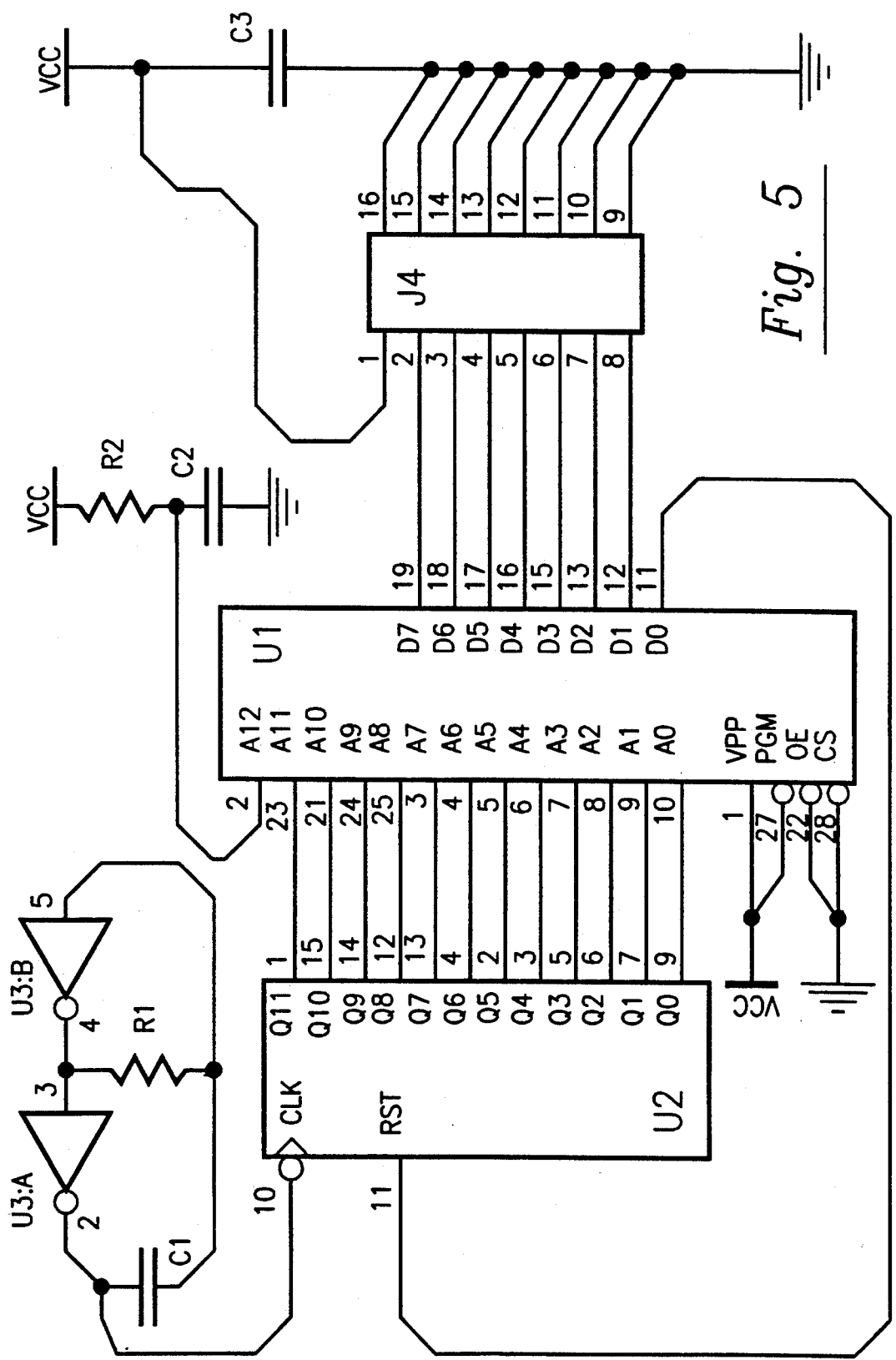
FIG. 5 illustrates a much simplified version of the apparatus of FIG. 1, retaining the basic features.

In addition to the preferred embodiment of FIG. 1 described in detail above, FIG. 5 illustrates a simplified device utilizing a simpler time base generator in the form of an R-C circuit in which capacitor C1 is charged alternately through inverters U3:A and then U3:B, both of which may conveniently be type 4049 devices. When one of the inverters U3:A or U3:B begins charging tee capacitor, it forces the input to the inverter high, with the output going low and the cascaded stages working out-of-phase with one another to set up an oscillation that provides the timing signal. This timing signal is provided to pin 10 of the counter U2, which may conveniently be a type MC14040B binary counter. This counter functions as the address pointer to the memory device U1, which operates substantially in the manner described with respect to FIG. 1 above. It may also be noted that a pause in the operation is provided upon initial application of power VCC as the capacitor C2 is charged through resistor R2 to provide power to the input A12. In this simplified arrangement the specific branch control, pause and master reset provisions of FIG. 1 are deleted, resulting in a sequencer that continues running without the pause, branch control and master reset events described with respect to FIG. 1. Also, for convenience, in the embodiment of FIG. 5 the output of the memory device U1 may suitably go to a 16 pin socket J4 as shown.

It is to be understood that the foregoing illustrate only a few preferred embodiments of the simplex sequence controller of the present invention and are thus illustrative only of the principles of the invention. Accordingly, the foregoing description is not intended to limit the scope of the invention, as numerous variations and modifications, all within the scope of the invention, will readily occur to those skilled in the art. The scope of the invention is to be limited solely by the claims appended hereto.

What is claimed is:

1. A simplex sequence controller for transmittal of output data of user specified duration and content, comprising a time base generator for generating a timing signal and including means for determining the pulse duration of said output data;

memory means having a plurality of addressable sequential storage locations for storing a sequence of data patterns within each said storage location for random access thereof, said memory means including a plurality of output lines connected to said storage locations, and a plurality of input address lines connected to said storage locations;

addressing means connected to said memory means input address lines for directing access to predetermined memory means storage locations at predetermined points in said data sequence; and address reset means providing feedback from a first predetermined one of said output lines of said memory means to said addressing means to direct access to a predetermined initial data sequence for output from said memory means.

2. The sequence controller of claim 1 further comprising means for selectively enabling or disabling said time base generator timing signal, whereby pauses in operation are provided.

3. The sequence controller of claim 1 wherein said addressing means comprises a counter that is incremented by said time base generator to provide a signal directing access to a predetermined memory means storage location at a predetermined point in said data sequence.

4. The sequence controller of claim 1 wherein said memory means storage locations are grouped into a plurality of logical banks of said locations, and wherein said sequence controller further comprises means for addressing various said banks in response to predetermined signals applied to a predetermined said memory means input line.

5. The sequence controller of claim 4 further comprising means for maintaining said bank addressing means in a first state addressing a first said bank in the absence of said predetermined signal on said predetermined memory means input line.

6. The sequence controller of claim 1 further comprising means for connected to both said time base generator and said memory means for selectively inhibiting the output of said time base generator to said addressing means to provide for a pause in said transmittal of output data.

7. The sequence controller of claim 1 further comprising means for testing external stimuli received by said sequence controller by comparing data from each said external stimulus to expected data stored in selected said storage locations in said memory means and, if said expected data equals said external stimulus data, then allowing said addressing means to advance to advance to reference a subsequent predetermined said memory means storage location.

8. The sequence controller of claim 1 wherein said address reset means further includes means for resetting said time base generator to a predetermined initial condition.

9. A simplex sequence controller for transmittal of data of user specified duration and content from a programmed memory device, comprising timing means providing timing interval signals for timing intervals of predetermined length, memory means for storing in chronological order a data sequence in the form of output data patterns, said data sequence being stored in a plurality of addressable sequential storage locations within said memory means, means for retrieving said data sequence from said plurality of said sequential memory locations upon receipt of a predetermined signal, and means for resetting said data sequence retrieving means for a subsequent data sequence retrieval operation.

10. The sequence controller of claim 9 wherein the number of said memory means storage locations used for storing said data sequence is defined by the amount of time required for transmitting said data sequence divided by said length of said timing interval.

11. The sequence controller of claim 9 wherein means for retrieving said data sequence comprises an address pointer for directing access to a predetermined memory means storage location at a predetermined point in said data sequence.

12. The sequence controller of claim 11 wherein said address pointer comprises a counter that is incremented by said timing means to provide a signal directing access to said memory means storage location that contains the portion of said data sequence to be yielded at a predetermined sequence time.

13. The sequence controller of claim 12 further comprising means for testing external stimuli received by said sequence controller by comparing data from each said external stimulus to expected data stored in said memory means for a predetermined time interval and, if said expected data equals said external stimulus data, then allowing said counter to advance to a subsequent said memory means storage location of said predetermined sequence.

14. The sequence controller of claim 12 further comprising means for applying external stimuli to said address pointer to provide a signal from said address pointer directing access to said memory means storage location that contains the portion of said data sequence that is to be yielded in response to said external stimuli.

15. The sequence controller of claim 9 further comprising means for selectively inhibiting said timing means to provide for a pause in operation of said controller.

* * * * *

UNITED STATES PATENT AND TRADEMARK OFFICE
CERTIFICATE OF CORRECTION

PATENT NO.   :   5,317,724
DATED        :   MAY 31, 1994
INVENTOR(S)  :   STEPHEN R. CLIPPARD

It is certified that error appears in the above-identified patent and that said Letters Patent is hereby corrected as shown below:

Claim 6, at column 9, line 48, delete the word "for".

Claim 7, at column 9, line 59, delete the first occurrence of the words "to advance".

Signed and Sealed this

Twenty-third Day of August, 1994

Attest:

BRUCE LEHMAN

Attesting Officer            Commissioner of Patents and Trademarks